Oct. 23, 1951     H. R. BRUET     2,572,696
SAFETY DEVICE FOR PROTECTING THE DEAD CENTERS OF MACHINE TOOLS
Filed April 26, 1950
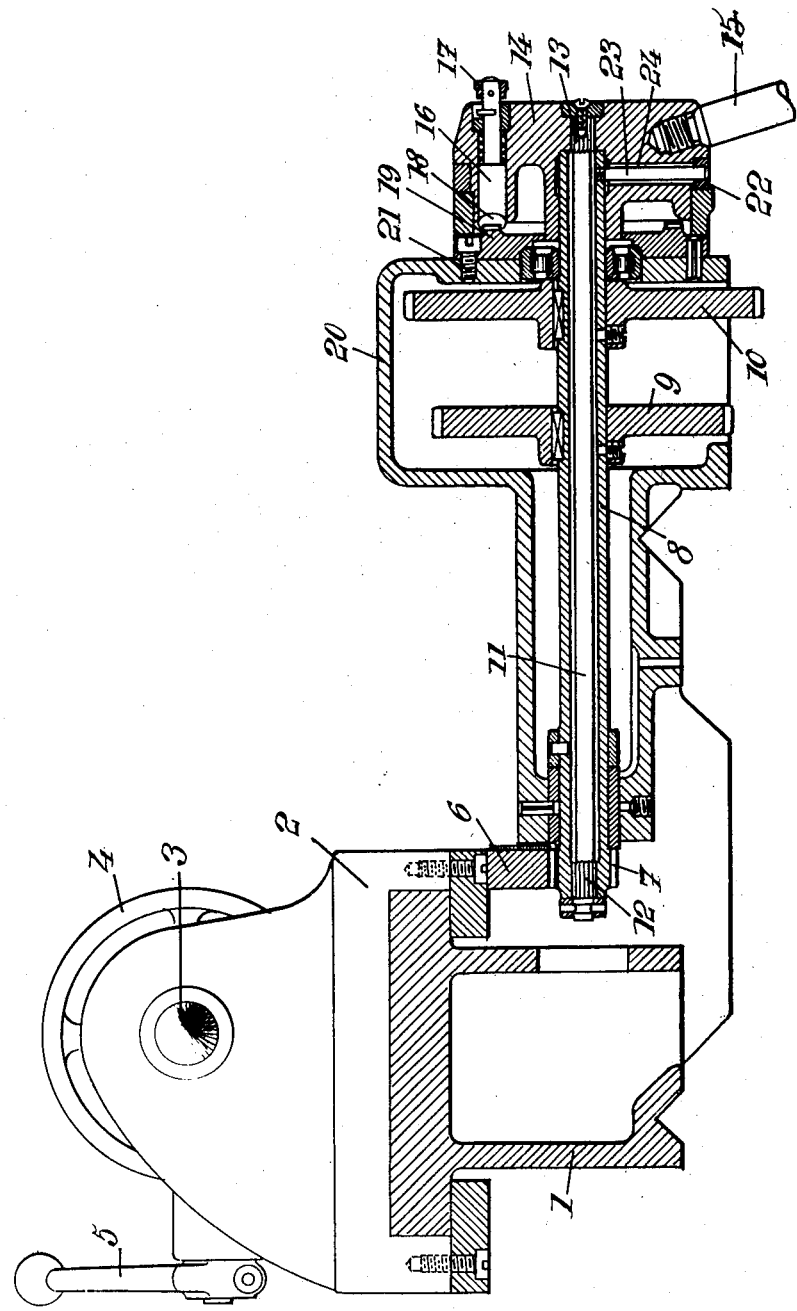
INVENTOR
HENRI RENÉ BRUET
BY
ATTORNEYS

UNITED STATES PATENT OFFICE 2,572,696

SAFETY DEVICE FOR PROTECTING THE DEAD CENTERS OF MACHINE TOOLS

Henri René Bruet, Neuilly-sur-Seine, France, assignor of one-half to Etablissements A. Cazeneuve, La Plaine-Saint-Denis (Seine), France, a society of France Application April 26, 1950, Serial No. 158,140
In France May 20, 1949

1 Claim. (Cl. 82—31)

The present invention relates to safety devices for the protection of the dead centers of machine tools such as lathes, milling machines and grinding machines, etc.

Its chief object is to provide a device of this kind which makes it possible to avoid excessive thrusts on the dead center, more especially when this element is held against the work and this work expands during machining, so as thus to avoid serious deteriorations of the machine and accidents.

It consists, chiefly, in holding the tailstock slide which supports said dead center in working position with respect to said frame by means of a torsion bar one end of which is coaxially fixed to a pinion journalled with respect to said frame and in mesh with a rack rigid with said tailstock slide, the other end of said torsion bar being rigid with a disc rotatable with respect to said frame and carrying a finger parallel to the axis of said disc and slidably urged by spring means bearing on said disc against the radial notches of another disc rigid with said frame.

A preferred embodiment of the present invention will be hereinafter described with reference to the accompanying drawings, given merely by way of example and in which the only figure of this drawing shows, in vertical section, the frame of a machine tool provided with a safety device according to my invention.

The machine tool proper, which may be a turret or other lathe, a milling machine, a grinding machine, etc., may be constituted in any suitable manner. This is why the drawing shows merely a portion of frame 1 and slide 2, said slide being suitably guided in this frame and carrying the dead center 3, with the usual operating means 4 and clamping means 5.

Slide 2 can be moved in one direction or the other, before it is fixed in the position for which the work is held between centers, through its usual control means constituted for instance by a rack 6 rigid with slide 2 and in mesh with a pinion 7 formed on a sleeve 8 which carries the toothed wheel or wheels 9 and 10 actuated by the usual driving means for moving the slide.

Up to the present time and when the operator had brought the slide and the dead center to their working position, determining the correct position by judgment, to obtain a suitable hold of the work between the centers, he clamped the control means in order to fix the slide with respect to the frame. It is clear that, when proceeding in this way, the work may be too tightly held between centers. Furthermore, due to expansion of the work during machining, the thrust exerted on the dead center may become so high that the machine, and more especially the bearings of the dead center, the slide and the control means thereof, run risks of being seriously damaged and accidents may occur.

According to my invention, in order to remedy these drawbacks, the slide, and consequently the dead center, are held in working position with respect to the machine frame by means of an elastic system (metallic torsion bar, coil spring, rubber block) having one end positively connected with said slide and the other end of which is adjustably fixed to the machine frame through retractable means, so as to permit the slide (and dead center) to move backward with respect to the frame when the thrust exerted on the dead center exceeds a predetermined value.

In the example chosen, it has been supposed, by way of example, that the elastic means are constituted by a torsion steel bar 11, disposed axially in sleeve 8 rigidly connected therewith by means of a key or of ribs 12 provided between the ends of sleeve 8 and bar 11 which are close to pinion 7 and rack 6. The other end of bar 11 is connected at 13 in an analogous manner with a coaxial disc 14 adapted to be rotated by means of a lever or handwheel 15 and which carries a spring finger or pawl 16 movable by means of a button 17. This finger has a beveled or similar end 18 adapted to engage one of the notches of a ring 19 provided with radial notches in its side wall. Ring 19 is coaxial with sleeve 8 and disc 14 and secured to a fixed portion of the frame 20 by screws 21. The notches of ring 19 thus constitute auxiliary abutments for torsion bar 11 and consequently for sleeve 8. The position of the working abutment is adjustable since disc 14 can be rotated by means of lever 15 in one direction or the other to engage finger 16 into any of the notches of ring 19. Bar 11 can thus be given a predetermined torsion which places sleeve 8 under a given preliminary tensioning.

The exact value of this tensioning, measured by the torsion angle of bar 11, is indicated by a vernier, constituted by a ring 22 freely engaged on disc 14 and fixed to sleeve 8 by a radial finger 23 extending through an aperture 24 provided in said disc 14. The external face of ring 22 carries graduations corresponding exactly to the teeth of ring 19 and which indicate the thrust exerted on the dead center, one of these graduations indicating the maximum thrust which cannot be exceeded. A mark provided on disc 14 cooperates with these graduations. Thus, an accurate and permanent checking of the thrust exerted on the dead center can be obtained by mere reading of the vernier indication. The operator can very easily modify the adjustment so as to increase or reduce the thrust, by disengaging finger 16 and moving disc 14.

When slide 2 is in working position, dead center 2 is subjected to a thrust from the work which tends to push slide 2 and rack 6 in the backward direction. This stress is transmitted by rack 6 to sleeve 8 and by sleeve 8 to one end of bar 11, tending to rotate said bar about its axis. As the other end of bar 11 is positively connected to fixed ring 21, bar 11 tends to be twisted. It resists this action without deformation as long as said action is below that of the preliminary tensioning imparted thereto. But as soon as, due to the operation of hand wheel 4 or to expansion of the work during operation, the stress transmitted from the work overcomes the preliminary tensioning stress, the bar yields and its torsion increases.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

In a machine tool including a frame, a dead center and a tailstock slide for supporting said dead center movable with respect to said frame in the direction of the dead center axis, a safety device for the protection of said dead center which comprises, in combination, a rack rigid with said slide, a pinion journalled in said frame and in mesh with said rack, a torsion bar coaxially fixed at one end thereof to said pinion, a disc rigid with the other end of said torsion bar rotatable with respect to said frame, a disc provided with radial notches rigidly carried by said frame coaxially with said first mentioned disc and with its notches turned toward said second mentioned disc, a finger slidable in said first mentioned disc in a direction parallel to the axis thereof adapted to engage any of said notches, and spring means interposed between said finger and said first mentioned disc for urging said finger toward said second mentioned disc.

HENRI RENÉ BRUET.

REFERENCES CITED

The following references are of record in the file of this patent:

UNITED STATES PATENTS

| Number | Name | Date |
|---|---|---|
| 1,311,947 | Chamberlin | Aug. 5, 1919 |
| 1,373,158 | Wilcox | Mar. 29, 1921 |

FOREIGN PATENTS

| Number | Country | Date |
|---|---|---|
| 450,881 | Germany | Oct. 15, 1927 |
| 487,590 | Great Britain | June 22, 1938 |